Patented Feb. 19, 1929.

1,702,285

UNITED STATES PATENT OFFICE.

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE.

METHOD OF FIREPROOFING AND PRESERVING WOOD.

No Drawing.   Application filed March 11, 1927.   Serial No. 174,641.

The invention relates to fireproofing and preserving wood and has as an object the provision of a process for treating wood so as to make the wood fireproof and in addition thereto to preserve the wood from decay.

It is an object of the invention to provide a process for fireproofing wood which will at the same time have the effect of a kiln dried treatment.

It is a further object of the invention to provide a process of the character referred to by which green lumber may be treated to make the same fireproof and at the same time produce the result of seasoning or kiln drying in a much shorter time than has heretofore been required for kiln drying only.

In the treatment of lumber according to the invention, a solution is first prepared of sodium hydrate, eight ounces to the gallon of water, which solution is placed in a receptacle suitable for treatment of lumber and raised to a temperature of 212° F. for a period of substantially one and one-half hours. The period of immersion will of course depend to some extent upon the dimensions of the lumber being treated.

After the described treatment of the lumber with the caustic soda solution, the solution is drawn off and as nearly a perfect vacuum as possible is created in the receptacle or retort. The rarefaction is preserved until substantially no moisture is shown by a vacuum trap to be passing from the retort. The retort is flooded without the admission of air as by the mere opening of a valve leading to the solution container, with a solution made up in the following proportions:

Water_____One gallon.
Calcium chloride_____Two and one-half pounds.
Ammonium chloride_____One-half pound.
Boric acid_____One-half pound.

The strength of this solution may be varied within considerable limits and is dependent to some extent upon the porosity of the lumber. When the retort has been filled with the above solution, the solution in the retort is placed under a pressure of substantially 150 pounds to the square inch and in the treatment of all lumber with the exception of white oak the temperature is maintained at substantially 175° F. In the treatment of white oak, this solution is used cold.

The pressure is maintained upon the solution until the wood has absorbed an amount of the solution corresponding to 220 pounds of solid matter per one thousand feet of lumber.

The absorption of solids can be determined by providing the retort with a graduated gauge glass and the level to which the liquid falls as it is absorbed by the lumber will indicate the amount of solution which has passed into the pores of the wood from which volumetric absorption the amount of solids which have passed into the wood can be calculated.

When this amount of absorption has been secured, the solution is withdrawn from the retort and hot air is blown into the retort for a period of substantially one hour to withdraw moisture and to thus concentrate the chemicals in the wood.

The lumber in the retort is then flooded with a solution made up as follows:

Water_____One gallon.
Zinc sulphate_____Four ounces.
Aluminum sulphate_____Four ounces.

This solution is applied at atmospheric temperature and the retort is then placed under compression of substantially 150 pounds to the square inch, which pressure is maintained from one to two hours according to the penetration which has been secured by the former treatments.

This solution is then withdrawn and the lumber is treated with pre-heated air for a period of substantially six hours when it is ready to be stacked for use.

If the lumber is destined for use in or close to water, the aluminum sulphate in the last described solution is replaced by a copper sulphate.

The first treatment of the lumber with the sodium hydrate has a result of saponifying the resins in the wood which by the fact of being thus saponified will pass out of the pores of the wood and will gather in the bottom of the retort from which the thus saponified resins may be drawn off and utilized as a valuable byproduct.

By thus removing the resins from the pores of the wood, the second solution is enabled to enter the pores and the subsequent treatment of the wood by zinc and aluminum sulphates is enabled to deposit gypsum within the pores of the wood thus rendering the wood absolutely fireproof and resistant to decay as well as strengthening the lumber by increase of its compressive strength.

The sulphates precipitated in the pores of the wood will retain a considerable portion of water as water of crystallization thus withdrawing a certain amount of free moisture which in connection with the evaporation of water by treatment with hot air for substantially the time named will place the wood in a condition which is equivalent to kiln dried wood. The finished product will reabsorb moisture from the atmosphere to a much less extent than will kiln dried wood.

Freshly sawn green lumber may be treated within a period of twenty-four hours to give an effect of kiln drying consuming five or six weeks with the added effects of making the wood absolutely fireproof, increasing its strength and its resistance to decay.

Minor changes in the steps of the process or in the proportions of the solutions used may be made within the scope of the appended claims without departing from the spirit of the invention.

I claim:

1. The process of treating resinous inflammable material which comprises removing the resins, then immersing the material in successive baths comprising solutions of chlorides and boric acid, and metallic sulphate respectively whereby to precipitate an insoluble sulphate in the pores of the material.

2. The process of treating resinous inflammable material which comprises treating the material with a solution of alkali to saponify and remove the resin, then treating the material with successive baths comprising chlorides and boric acid, and a metallic sulphate respectively whereby to precipitate an insoluble sulphate in the pores of the material.

3. The process of treating wood which comprises treating the wood with a hot solution of caustic alkali for saponification and removal of resins, immersing the wood in a solution comprising boric acid and calcium and ammonium chlorides, and subsequently immersing the wood in a solution comprising a metallic sulphate.

4. The process of treating wood which comprises treating the wood with a heated solution of caustic alkali for a period of time sufficient to remove a substantial portion of the resin thereof in a saponified condition, subjecting the wood to vacuum in an evacuated container, introducing into the evacuated container a solution of boric acid and calcium and ammonium chlorides to immerse the wood, applying pressure to the solution with the wood immersed therein and subsequently immersing the wood in a solution of metallic sulphates.

5. The process of treating wood which comprises treating the wood with a heated solution of caustic alkali, withdrawing the solution and subjecting the wood to vacuum until substantial cessation of escape of moisture, immersion of the wood in a solution comprising boric acid and calcium and ammonium chlorides under pressure, concentrating the solids of the solution absorbed by the wood by evaporation, immersion of the wood in a solution comprising a metallic sulphate, and evaporating surplus water to complete the treatment.

6. The process of treating wood which comprises the wood with a heated solution of caustic alkali, withdrawing the solution and subjecting the wood to vacuum, immersing the wood in a solution comprising boric acid and chlorides to cause entry into the wood of a definite amount of the solids of the solution, concentrating the solids in the wood by evaporation, immersing the wood in a solution of metallic sulphates under pressure, withdrawing the solution and evaporating moisture from the wood.

7. The process of treating wood which comprises treating the wood with a caustic soda solution at substantially at 212° F. for a period of substantially one and one-half hours varying according to the dimensions of the wood to saponify and remove a substantial portion of the resin of the wood, evacuating a container containing the wood and maintaining the vacuum until substantial cessation of escape of moisture from the wood, introducing an aqueous solution of calcium chloride, ammonium chloride and boric acid into the evacuated container to immerse the wood, applying a pressure of substantially 150 pounds per square inch upon the solution and maintaining the pressure until absorption by the wood of substantially two hundred pounds of the solids of the solution per one thousand board feet of the wood, treatment of the wood with hot air to concentrate the solids in the wood, treating the wood with an aqueous solution of zinc and aluminum sulphates under a pressure of substantially 150 pounds per square inch for a period of time varied according to the penetration secured by the former treatments, and treating the wood with preheated air for a period of substantially six hours.

In testimony whereof I affix my signature.

FERNANDO SOMOZA VIVAS.